United States Patent [19]

Tokoro et al.

[11] Patent Number: 5,136,495
[45] Date of Patent: Aug. 4, 1992

[54] SPEED RATIO CONTROL SYSTEM AND METHOD FOR A CONTINUOUSLY VARIABLE TRANSMISSION FOR A VEHICLE

[75] Inventors: Setsuo Tokoro; Tomoyuki Watanabe; Takashi Hayashi, all of Susono; Takashi Shigematsu, Mishima, all of Japan

[73] Assignee: Toyota Jidosha Kabushiki Kaisha, Toyota, Japan

[21] Appl. No.: 573,822

[22] Filed: Aug. 28, 1990

Related U.S. Application Data

[62] Division of Ser. No. 867,443, May 28, 1986, Pat. No. 4,999,774.

[30] Foreign Application Priority Data

May 28, 1986 [JP] Japan .................. 60-115055

[51] Int. Cl.$^5$ ................... B60K 41/18; G06F 15/20
[52] U.S. Cl. ..................... 364/424.1; 74/866; 474/12
[58] Field of Search ............ 364/424.1, 426.04; 474/11, 12, 18; 74/866-869

[56] References Cited

U.S. PATENT DOCUMENTS

| | | | |
|---|---|---|---|
| 4,261,229 | 4/1981 | Mizuno et al. | 74/866 |
| 4,648,040 | 3/1987 | Cornell et al. | 364/424.1 |
| 4,649,485 | 3/1987 | Osanai et al. | 364/424.1 |
| 4,649,487 | 3/1987 | Osanai et al. | 364/424.1 |
| 4,649,488 | 3/1987 | Osanai et al. | 364/424.1 |
| 4,702,128 | 10/1987 | Oshiage | 74/866 |
| 4,704,683 | 11/1987 | Osanai | 364/424.1 |
| 4,710,879 | 12/1987 | Vahabzadeh | 364/424.1 |
| 4,718,306 | 1/1988 | Shigematsu et al. | 74/866 |
| 4,729,103 | 3/1988 | Oshiage et al. | 364/424.1 |
| 4,743,223 | 5/1988 | Tokoro et al. | 474/69 |

Primary Examiner—Parshotam S. Lall
Assistant Examiner—V. N. Trans
Attorney, Agent, or Firm—Oliff & Berridge

[57] ABSTRACT

A speed ratio control system of a continuously variable transmission for a vehicle is provided, wherein a speed ratio is feedback-controlled in association with a deviation between a target and a measured value, so that the speed ratio can be continuously varied and adjusted. A gain of feedback control or shift speed is utilized, which has been constant or accurately determined, and the gain of feedback control or shift speed is optimally set in accordance with the feedback control, so as to obtain a continuously variable transmission which has high response characteristics and stability.

3 Claims, 11 Drawing Sheets (A)

(B)

(A)

(B)

SPEED RATIO CONTROL SYSTEM AND METHOD FOR A CONTINUOUSLY VARIABLE TRANSMISSION FOR A VEHICLE

This is a Division of application Ser. No. 06/867,443 filed May 28, 1986, now U.S. Pat. No. 4,999,774.

BACKGROUND OF THE INVENTION

This invention relates to a speed ratio control system of a continuously variable transmission for a vehicle, wherein a speed ratio is feedback-controlled in association with a deviation between a target and a measured value, so that the speed ratio can be continuously varied and adjusted, more particularly this invention relates to improvements in a speed ratio control system of a continuously variable transmission for a vehicle, wherein better shift characteristics can be obtained by improving a shift speed or a gain of feedback control.

In general, continuously variable transmission mechanisms include V-shaped pulley devices, each including a stationary pulley and a movable pulley, and each having an effective diameter which can be varied by hydraulic servo devices. These V-shaped pulleys are provided on input shafts and output shafts respectively, so that rotation of the input shaft can be shifted in the continuously variable manner and transmitted to the output shaft by a driving belt extending between the V-shaped pulley devices. Normally, an oil flowrate to the hydraulic servo device on the input side is varied by a flow control valve, whereby the effective diameter of the V-shaped pulley device on the input side is forcibly changed. On the other hand, hydraulic pressure of the hydraulic servo device on the output side is varied by a pressure control valve to thereby follow the change of the effective diameter of the V-shaped pulley device on the input side, so that the driving belt will not slip in transmitting the torque.

As compared with automatic transmission mechanisms, which consist of so-called torque converters with groups of planetary gear units, the above-described continuously variable transmission mechanisms are advantageous in that abrupt changes in driving force during running of the vehicle are reduced, shift shocks are low, and the fuel consumption rate is good. In recent years, there is an increased demand for further improvements in continuously variable transmission mechanisms.

The speed ratio control of continuously variable transmissions has heretofore been performed as described below. First, a target value (normally, a target rotational speed Nin* or a target speed ratio e*) is calculated, a deviation $D=Nin^*-Nin$ (or $D=e^*-e$) is calculated, and, in association with this deviation D, an oil flowrate Q (=a control voltage Vin of the flow control valve, being commensurate to the oil flowrate Q) to the hydraulic servo device on the input side is calculated through an equation $Vin = K \cdot D$. K is a feedback gain and has heretofore been set at a constant value. Furthermore, this control voltage Vin has determined the oil flowrate at the flow control valve, and in turn, determined the shift speed. As a consequence, heretofore, the feedback gain K has been set at a constant value, and, the shift speed has been also inevitably determined in association with a deviation between a target value and a measured value.

However, the conventional control described above presents a disadvantage in that it may not satisfactorily smoothly transfer the measured value to the target value during the transitional period and stably maintain the continuously variable transmission at the target value at steady state.

SUMMARY OF THE INVENTION

The present invention was developed to obviate the above-described disadvantages of the prior art. Accordingly, it is an object of the present invention to provide a speed ratio control system for a continuously variable transmission, wherein, a gain of feedback control or shift speed is improved. The gain, is optimally set in association with the feedback control, so as to obtain a continuously variable transmission with good response characteristics and stability.

To achieve the above-described object, a first aspect of the present invention contemplates that, in a speed ratio control system for a continuously variable transmission, wherein a speed ratio is feedback-controlled in association with a deviation between a target and a measured value, so that the speed ratio can be continuously varied and adjusted, the system is provided with at least means for setting a target shift speed in association with the rotating conditions of an engine and means for setting a gain of the feedback control in association with the target shift speed.

In a specific form of the first aspect of the present invention, information to indicate the rotating conditions of the engine could include an engine rotational speed, an engine torque, a throttle opening, negative pressure of an intake manifold and engine cooling water temperature, so that the target shift speed can be precisely set.

In another specific form of the first aspect of the present invention, a gain of the feedback control is set to be in proportion to the target shift speed, so that the gain of the feedback control can be precisely set.

In another specific form of the first aspect of the present invention, a gain of the feedback control is separately set, depending on a positive or a negative sign of a shift speed, i.e. an increase or a decrease in speed, so that poor response, resulting from a difference in characteristics due to the oil flow direction in the flow control valve is obviated.

A second aspect of the present invention contemplates that, in a speed ratio control system of a continuously variable transmission, wherein a speed ratio is feedback-controlled in association with a deviation between target and measured values, so that the speed ratio can be continuously varied and adjusted, the system is provided with means for detecting the magnitude of the deviation between the target and the measured values and means for varying a gain of the feedback control, depending on whether the deviation is large or small.

In a third aspect of the present invention, the speed ratio is feedback-controlled in association with a deviation between target and measured values, so that the speed ratio can be continuously varied and adjusted. The system is provided with means for detecting whether the deviation between the target and the measured values is small, and means for setting a target shift speed in association with the deviation when the deviation is small.

In a specific form of a third aspect of the present invention, the target shift speed is set in proportion to the deviation, so that the target shift speed can be precisely set.

In a fourth aspect of the present invention, the system is provided with at least means for setting a target shift speed in accordance with the rotating conditions of the engine, means for detecting an actual shift speed and means for reflecting a signal associated with a deviation between the target shift speed and the actual shift speed in a manipulated variable signal associated with the deviation between the target value and the measured value in the feedback control.

In a specific form of the fourth aspect of the present invention, information to indicate the rotating condition of the engine could include an engine rotational speed, an engine torque, a throttle opening, negative pressure of an intake manifold and engine cooling water temperature.

One of the specific problems in the prior art, is that the measured value (the result of feedback control=-controlled variable) becomes vibratory. One of the causes is the flow control valve. The characteristics of the flow control valve which correspond to one of the final controlling elements is normally shown in FIG. 5. As shown in a portion A in FIG. 5, the flowrate characteristics to a control voltage (control current) is steep in the rising portion, and in the extreme case, substantially ON-OFF control is effected. As a consequence, it is difficult to effect accurate control in a very small flowrate.

In the first aspect of the present invention, a feedback gain is varied and adjusted in association with a shift speed, so that, when the shift speed is slow, i.e. the change in flowrate is small, the feedback gain of the speed ratio control can be made small so as to suppress the vibrations of an output.

In the second aspect of the present invention, the magnitude of a deviation between the target and the measured values is detected, and, when the deviation is large (during shifting), the feedback gain is set at a large value so as to improve response, whereas, when the deviation is small (during running at a constant speed), the feedback gain is set at a small value so as to improve stability.

In the third aspect of the present invention, the deviation between the target and the measured values is detected. When the deviation is small, a shift speed, commensurate to the deviation, is set. When the deviation is large, the feedback control can be effected in such a manner that a shift speed is adopted in which the consumption rate, response and the like are important. When the deviation is small, the feedback control can be stably effected at a shift speed commensurate to the deviation. Particularly, this third aspect of the present invention is effective in setting a comparative value (setting shift speeds) in a conventional feedback control.

On the other hand, as aforesaid, the control has heretofore been effected according to the equation of $Vin = K \cdot D$ for example, whereby, even if a shift demand is issued, unless an absolute value $|Nin^* - Nin|$ of the deviation increases to some extent after a lapse of some period of time, a control voltage Vin (manipulated variable) does not increase, thus creating a poor response. According to the fourth aspect of the present invention, for example, through an equation of $Vin = Kp (Nin^* - Nin) + Kd (dNin^* - dNin)$, a signal associated with a deviation between a target shift speed $dNin^*$ and an actual shift speed $dNin$ is reflected in a manipulated variable associated with a deviation between the target and the measured values, so that, upon issuing the shift demand, the target shift speed $dNin^*$ is immediately varied and the control voltage Vin can be rapidly generated because of the term in the right member of the above-mentioned equation. Thus, the response can be improved accordingly.

BRIEF DESCRIPTION OF THE DRAWINGS

The exact nature of this invention, as well as other objects and advantages thereof, will be readily apparent from the description of the invention which follows, taken in conjunction with the accompanying drawings, in which like reference characters designate the same or similar elements, and wherein.

DETAILED DESCRIPTION OF THE PREFERRED EMBODIMENT

Detailed description will hereunder be given of one embodiment of the present invention with reference to the accompanying drawings.

Figure 1:
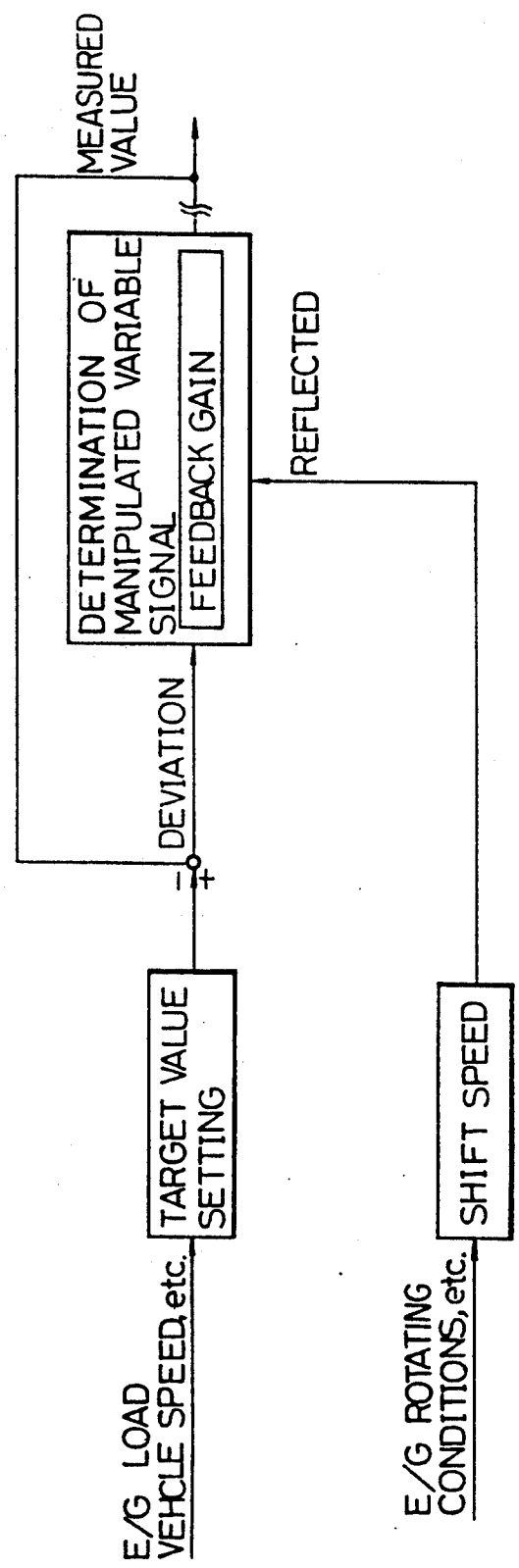
FIGS. 1 to 4 are block diagrams showing the technical aspects of the speed ratio control system of the continuously variable transmissions for a vehicle according to the present invention, respectively.
Figure 2:
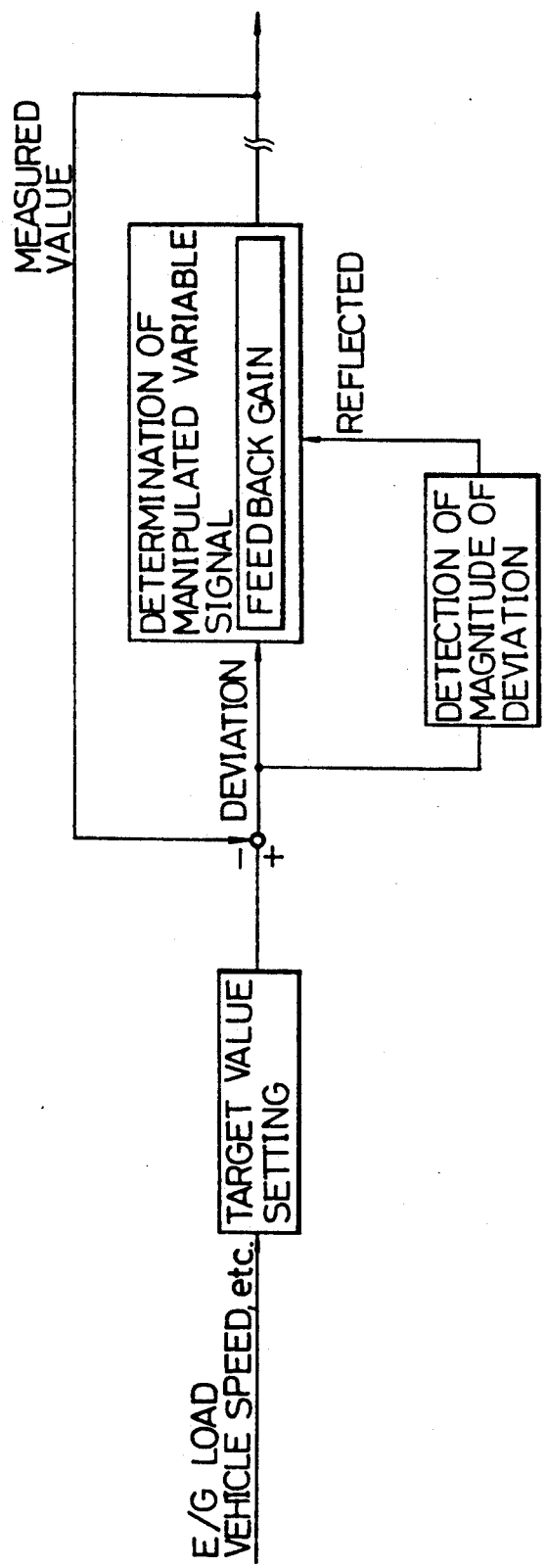
Figure 3:
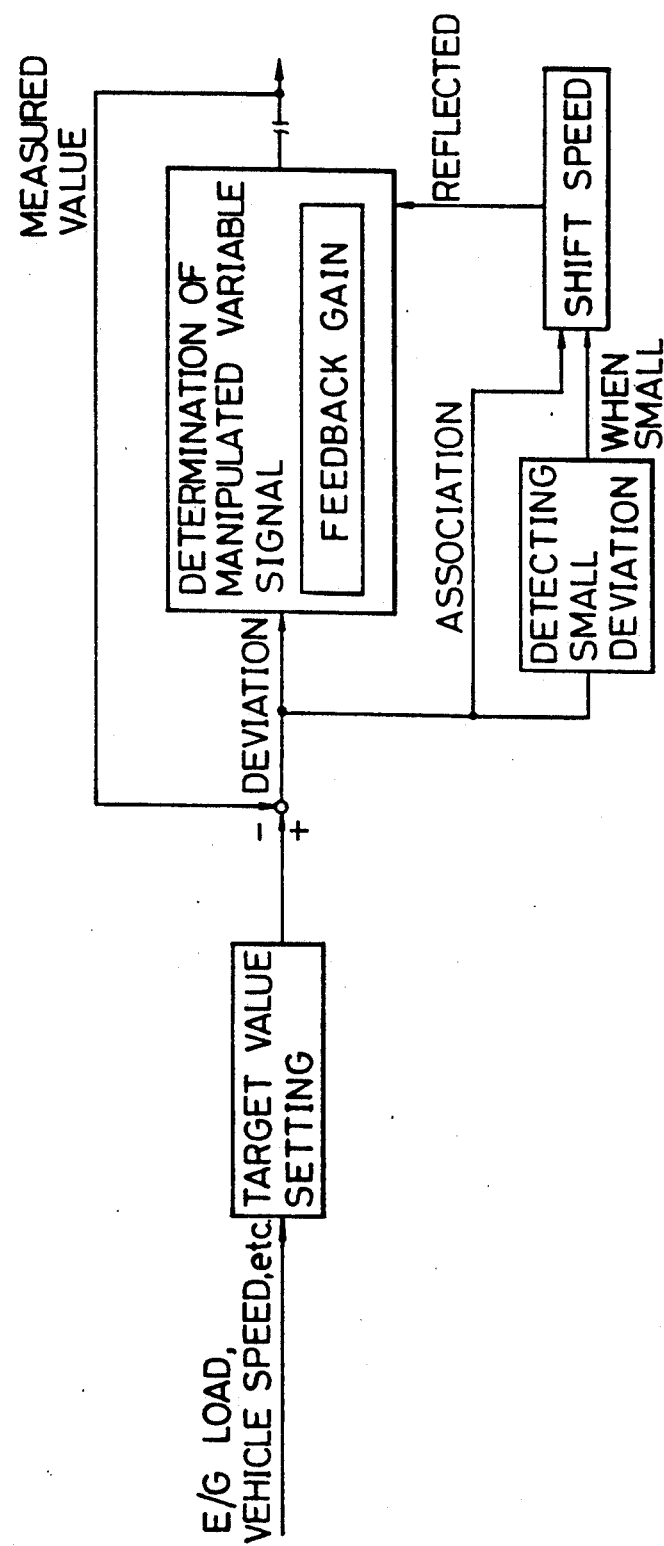
Figure 4:
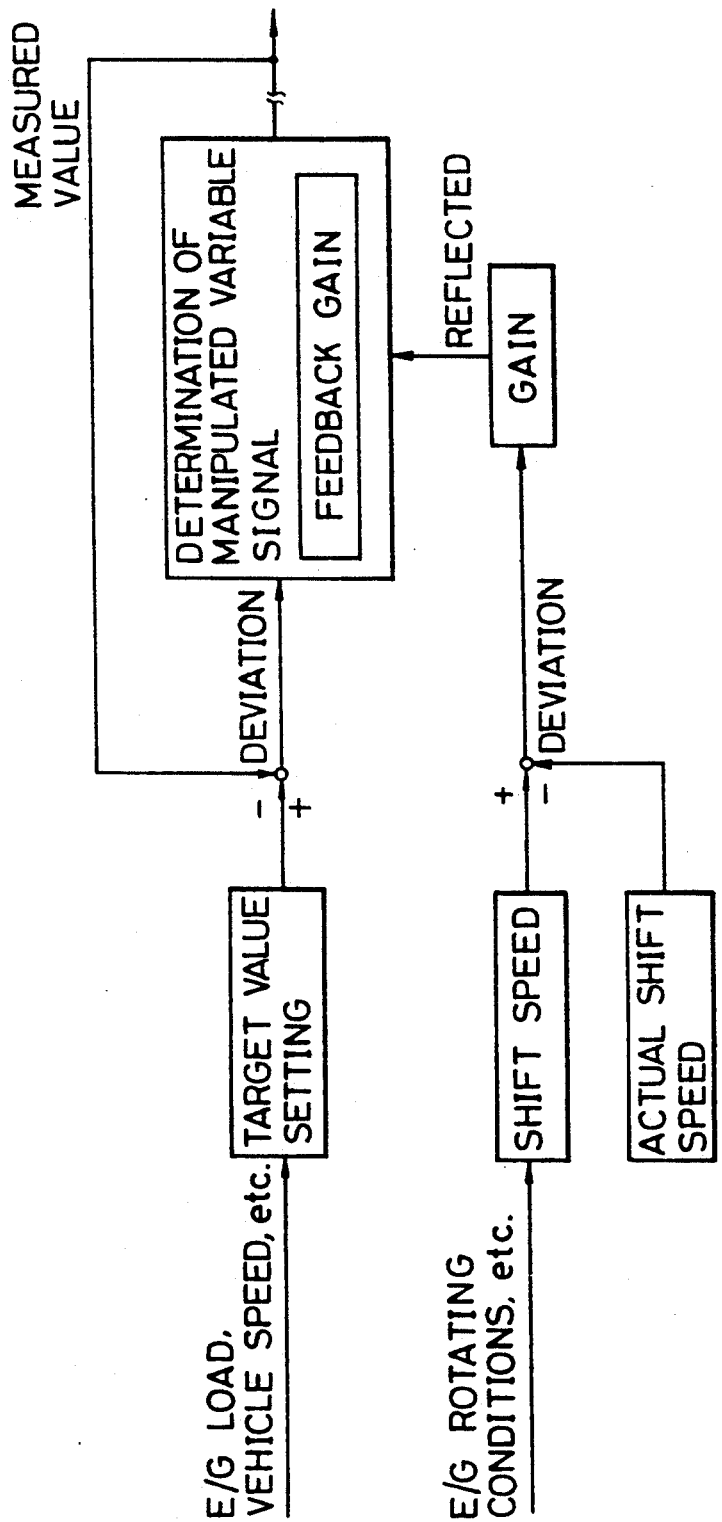
Figure 5:
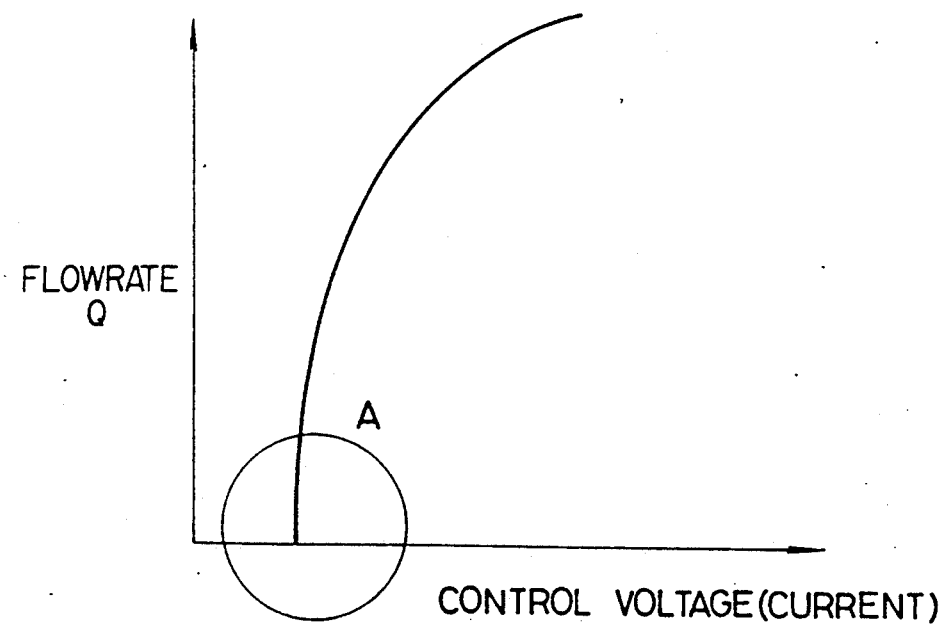
FIG. 5 is a chart showing the characteristics of the flow control valve.
Figure 6:
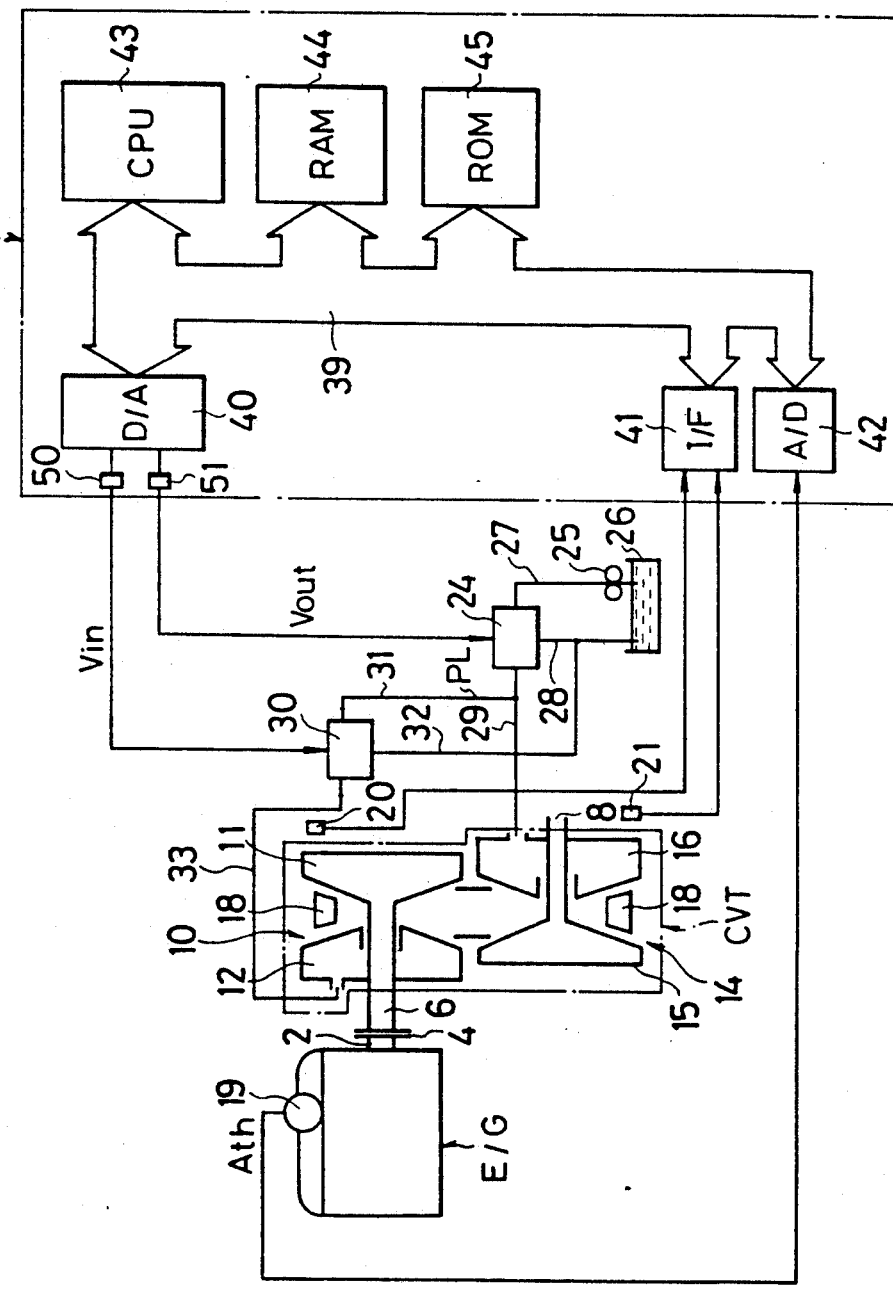
FIG. 6 is a schematic block diagram showing the continuously variable transmission for a vehicle embodying the present invention.

FIG. 6 shows the general continuously variable transmission system for a vehicle, to which the speed ratio control system according to the present invention is applied.

Referring to the drawing, an output shaft 2 of an internal combustion engine E/G is connected to a continuously variable transmission (hereinafter referred to as a "CVT") through a fluid coupling 4. This CVT includes V-shaped pulleys 10 and 14 positioned on input and output shafts 6 and 8, respectively. V-shaped pulley 10 includes a stationary pulley 11 and a movable pulley 12. V-shaped pulley 14 includes a stationary pulley 15 and a movable pulley 16. The stationary pulley 11 on the input side is fixed to the input shaft 6 and the movable pulley 12 on the input side is axially movably coupled to the input shaft 6 through splines, ball bearings or the like. Similarly, the stationary pulley 15 on the output side is fixed to the output shaft 8 and the movable pulley 16 on the output side iss axially movably coupled to the output shaft 8 through splines, ball bearings or the like. Pressure receiving areas of the respective movable pulleys 12 and 16 are set such that the pressure receiving area on the input pulley is larger than the pressure receiving area on the output pulley. A forcible change in the effective diameter, to vary the speed ratio, can thus be made on the input side. On the input and the output sides, movement in the axial directions of the movable pulleys 12 and 16, in relation to the stationary pulleys, is made opposite to each other, so that a driving belt 18 is constantly guided around the input and the output shaft 6 and 8 at right angles to the lengths of shafts 6 and 8.

Opposed surfaces of the stationary pulleys 11, 15 and the movable pulleys 12, 16 are tapered with distances between the opposed surfaces increasing radially outwardly. The driving belt 18 is of a general isosceles trapezoid shape in cross section. The contact positions between driving belt 18 and the pulley surfaces continuously varies as the distance between stationary and movable pulleys of the respective V-shaped pulley devices 10 and 14 varies. When the contact positions of the driving belt 18 in the V-shaped pulley device 10 on the input side move radially outwardly, the contact positions of the driving belt 18 in the V-shaped pulley device on the output side move radially inwardly, and the speed ratio e of the CVT (e=Nout (the rotational speed of the output shaft 8)/Nin (the rotational speed of the input shaft)) increases, whereas, in the opposite case, the speed ratio e decreases.

A driving force of the output shaft 8 is transmitted to a traction wheel by a planetary gear unit which switches the forward and reverse directions of movement, gears for speed decrease, differential gears and the like which are not shown.

A throttle opening sensor 19 detects an opening Ath of a throttle valve (not shown) of the intake system. An accelerator pedal (not shown) is connected to the throttle valve of the intake system. The output from the engine E/G can therefore be a desired function of a value indicative of the depression of the accelerator pedal.

The rotational angle sensors 20 and 21 on the input and output sides of the CVT detect the angles of rotation of the pulleys 11 and 16, respectively. As a result, the input shaft speed and the output shaft speed (rpm) are detected.

A pressure control valve 24 controls a spill value of oil delivered from a reservoir 26 through an oil line 27 by an oil pump 25 to an oil line 28, to thereby regulate a line pressure PL of an oil line 29. A hydraulic servo device of the movable pulley 16 on the output side is fed with the line pressure PL through the oil line 29.

A flow control valve 30 controls oil flowing into and flowing out of the movable pulley 12 on the input side. To maintain the speed ratio e of the CVT at a constant value, an oil line 33 is disconnected from a line pressure oil line 31, which branches from the oil line 29, and a drain oil line 32. As a result, the axial position of the movable pulley 12 on the input side is held constant and the speed ratio e is maintained at a constant value. To increase the speed ratio e, oil is fed into the hydraulic servo device of the movable pulley 12 on the input side, from the line pressure oil line 31, through the oil line 33. As a result, the clamping force between the pulleys 11 and 12 on the input side increases, whereby the distance between pulleys 11 and 12 decreases and the contact positions of the driving belt 18 on the surfaces of the pulleys 11 and 12 on the input side move radially outwardly. Thus, the speed ratio e increases. On the other hand, to decrease the speed ratio e, oil in the hydraulic servo device of the movable pulley 12 on the input side is drained through the oil drain line 32, whereby the clamping force between the pulleys 11 and 12 on the input side decreases. The oil pressure in the oil line 33 is less than the line pressure PL. However, as described above, the pressure receiving area of the hydraulic servo device of the movable pulley 12 on the input side is set at a value larger then that of the pressure receiving area of the hydraulic servo device of the movable pulley 16 on the output side, so that the clamping force between the pulleys 11 and 12 can be larger than the clamping force between the pulleys 15 and 16 on the output side.

The clamping force of the pulleys 11 and 12 on the input side is varied by the flow control valve 30, whereby the effective diameter between the pulleys 11 and 12 on the input side is changed. On the other hand, the line pressure PL is regulated by the pressure control valve 24, whereby the clamping force is generated between the pulleys 15 and 16 on the output side so that following the change in the effective diameter on input side, driving belt 18 can transfer the torque from the input to the output without slip.

An electronic control unit 38 includes a D/A converter 40, an input interface 41, an A/D converter 42, a CPU 43, a RAM 44 and a ROM 45, which are connected to each other by an address data bus 39. An analogue output from the throttle opening sensor 19 is delivered to the A/D converter 42, and pulses from the rotational angle sensors 20 and 21 are delivered to the input interface 41. The control voltages Vin and Vout to the flow control valve 30 and the pressure control valve 24 are delivered from the D/A converter 40 through amplifiers 50 and 51 respectively.

The basic principle of the control of this embodiment will now be described with reference to FIGS. 7 and 8.

Figure 7:
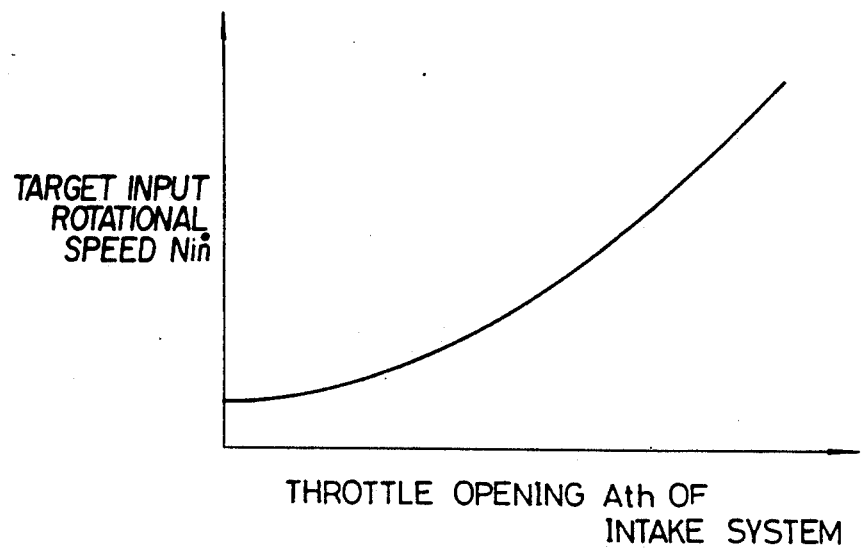
FIG. 7 is a chart showing the relationship between an intake throttle opening and a target input rotational speed in explanation of the advantage of introducing the idea of the comparative value.
Figure 8:
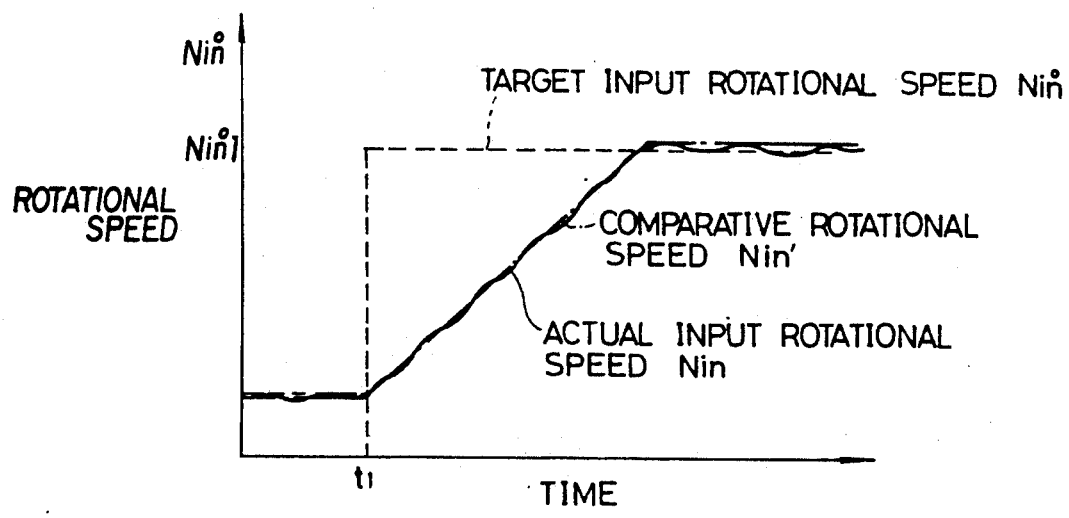
FIG. 8 is a chart showing the relationship between a target input rotational speed, an actual input rotational speed and a comparative rotational speed, along the time axis.

In FIG. 7, the throttle opening Ath of the intake system is given as an abscissa and the target input rotational speed Nin° (a target engine rotational speed Ne°) is given as an ordinate. As described in detail in Japanese Patent Application No. 67362/1982 and the like, Ath—Nin° is set so that an output demanded can be obtained at the minimum fuel consumption rate. FIG. 8 shows a change per unit time duration of the input rotational speed Nin and the like of the CVT. When the target input rotational speed Nin° is changed too Nin° 1 in a stepped manner at a time t1, if Nin is controlled, utilizing Nin° 1 as the direct target value, then, when Nin approaches the target value Nin° 1, a change per unit time duration decreases. This is disadvantageous because it causes a delay in reaching the target value. To overcome this delay, in one advantageous embodiment of this invention, comparative rotational speeds Nin' are set in addition to the target input rotational speed Nin°, and Nin is feedback-controlled, utilizing Nin' as the target values. The comparative rotational speeds Nin' are set as the ideal locus of Nin, i.e. the ideal locus of the shift speeds until Nin reaches the proper target value Nin°. Optimal values for Nin' are selected experimentally, using theorectical formulas and the like, in association with the engine rotating conditions and in consideration of the various control performances. (In a third part of the present invention, when a deviation between the target input rotational speed and the real input rotational speed is small, this locus is determined in association with this deviation). Additionally, the feedback control of comparative values is described in detail in Japanese Patent Laid-Open (Kokai) No. 26656/1984.

Figure 9:
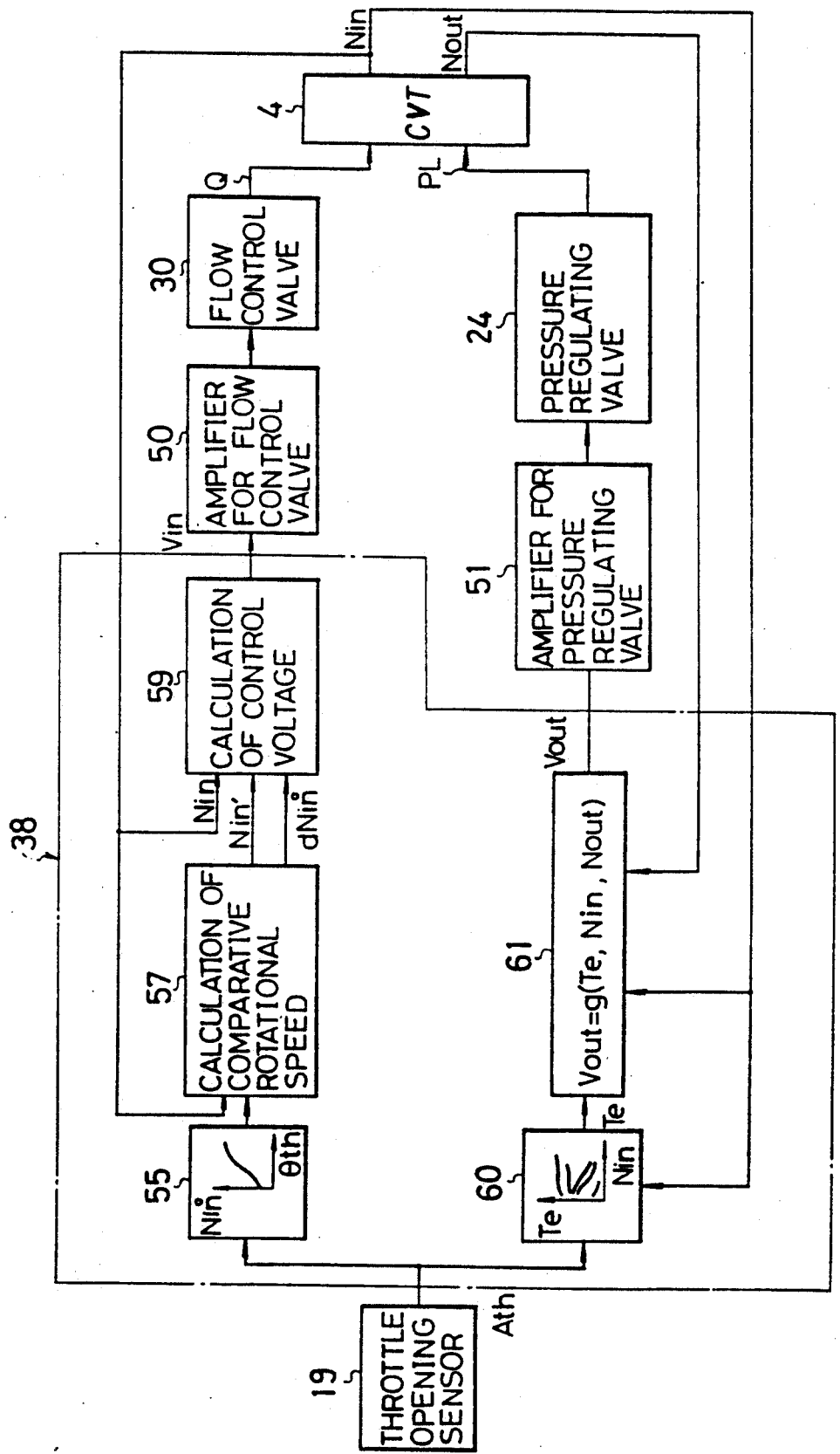
FIG. 9 is a block diagram regarding the speed ratio control used in the system in the above-described embodiment.

FIG. 9 is the general block diagram showing the control system in the above-described embodiment of this system. The outline of the control system will first be described with reference to FIG. 9. In block 55, the target input rotational speed Nin° is determined as a function of the throttle opening Ath, on the basis of the throttle opening Ath detected by the throttle opening sensor 19. In block 57, the target input rotational speed Nin° and the actual input rotational speed Nin are inputted and the comparative rotational speed Nin' (being set in association with the target shift speed dNin°) is calculated. In block 59, the control voltage Vin to the flow control valve 30 is determined on the basis of the comparative rotational speed Nin' and this control voltage Vin is delivered to the flow control valve 30 through an amplifier 50. As the result, a flowrate Q to the hydraulic servo device on the input side through the flow control valve 30 is varied, whereby the speed ratio e of the CVT, namely, Nin is varied. More specifically, Nin is feedback-controlled, utilizing the comparative rotational speed Nin' as new target value. An additional detailed description will be given later of the calculations in blocks 57 and 59.

In block 60, an engine output torque Te is calculated as a function of the throttle opening Ath and the input rotational speed Nin. In block 61, the control voltage Vout of the pressure control valve is determined as a function g of the engine output torque Te, and the input and output rotational speeds Nin and Nout of the CVT. This control voltage Vout is delivered to the pressure control valve 24 through an amplifier 51 for the pressure control valve. As the result, the line pressure PL is maintained at the minimum value required to transfer the torque by the driving belt 18 without slip. Thus, a loss of the driving force due to an excessive line pressure and a lowered durability of the belt can be avoided.

Figure 10:
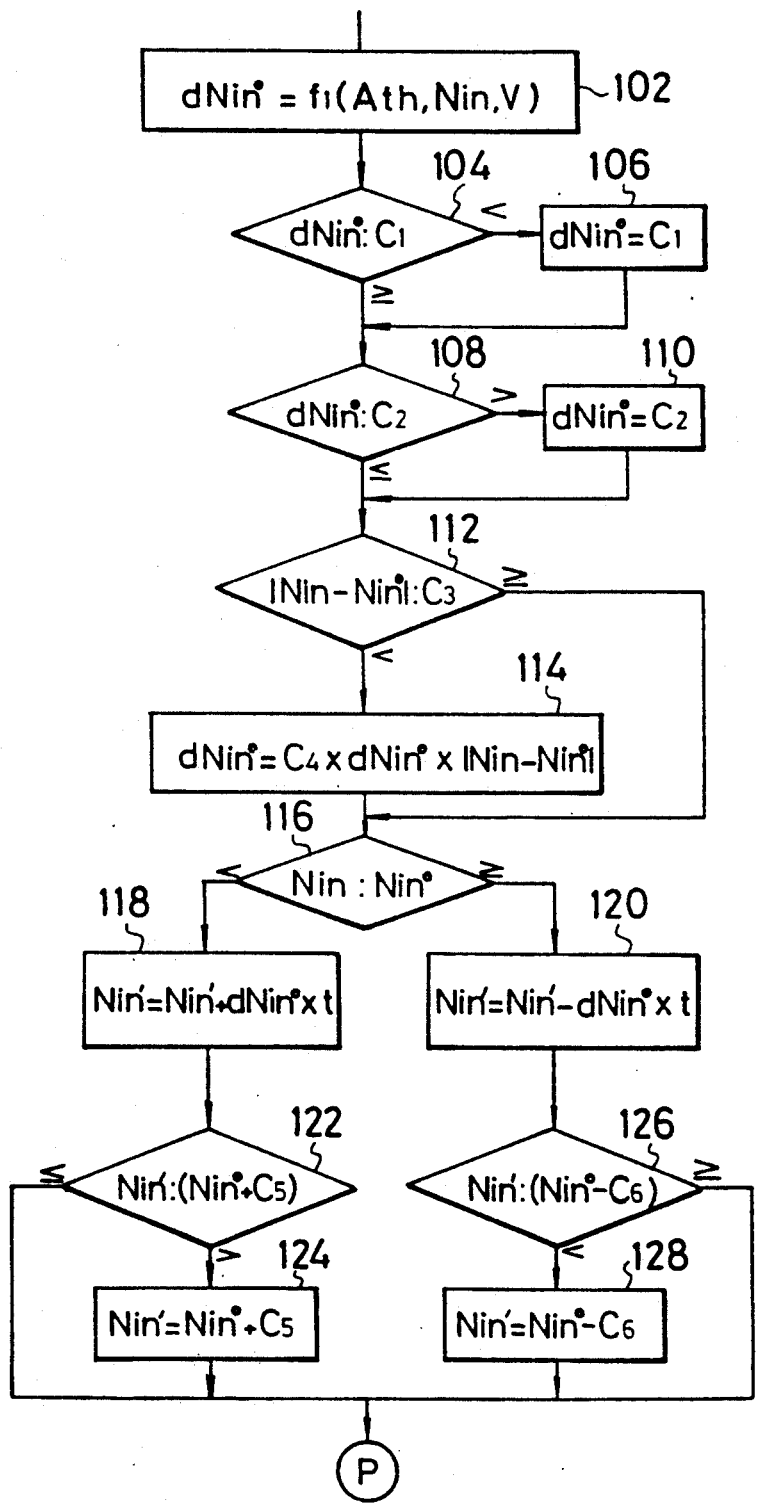
FIG. 10(A) and 10(B) are a flow chart showing the routine of the speed ratio control as a whole.
Figure 10:
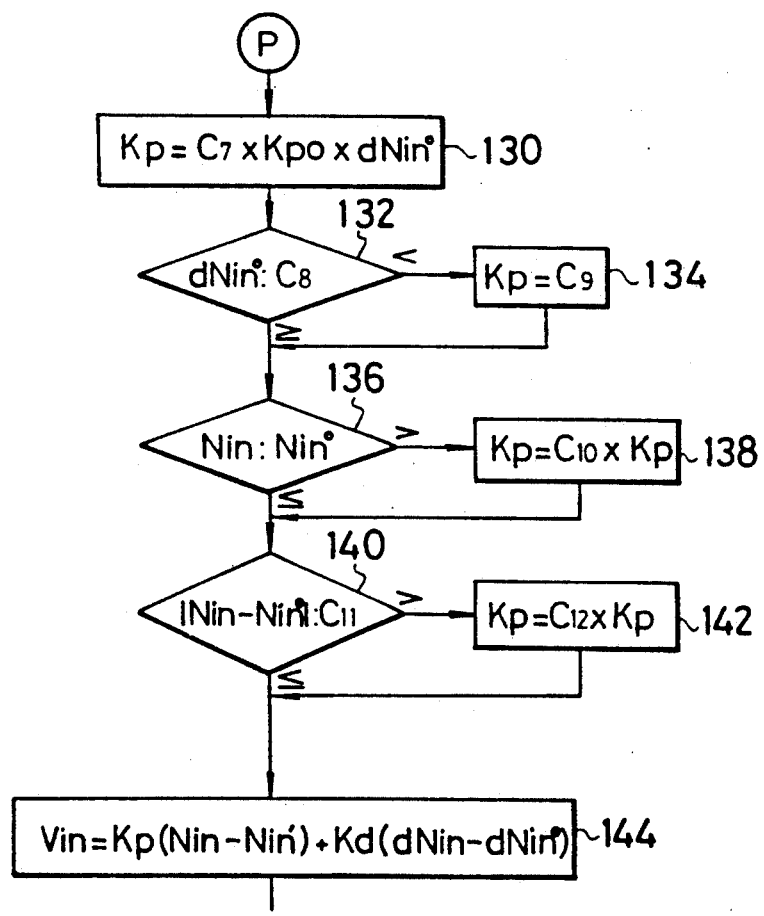

Details of calculations in the blocks 57 and 59 will be described hereinunder with reference to the flow chart shown in FIGS. 10(A) and 10(B).

Firstly, in Step 102, the target shift speed dNin° is determined by calculating as a function $f_1$, or referring to a map, on the basis of the throttle opening Ath, the CVT input rotational speed Nin, a vehicle speed V and the like. Additionally, the target shift speed dNin° may be determined on the basis of the engine output torque Te, negative pressure of the intake manifold, the engine rotational speed Ne, the speed ratio e and the like, in addition to the above-mentioned factors or in place of the above-mentioned factors. Prior to warm-up of the engine, dNin° may be suitably corrected by the engine cooling water temperature, the CVT oil temperature and the like. In any case, the target shift speed dNin° is preferably based on the engine rotating conditions. However, there is no restriction on the relationship used to determine the target shift speed dNin°.

Subsequently, in Steps 104–110, limits of the maximum value and the minimum value are applied to the target shift speed dNin°, whereby the value of dNin° must be more than C1 and less than C2.

In Step 112, an absolute value of a difference between the measured input rotational speed Nin and the target input rotational speed Nin°, i.e. an absolute value of the deviation D, and a constant C3 are compared in magnitude. When the deviation D is larger than the constant C3, namely, during shifting for example, dNin° sought in Step 102 is used as it is. However, when the deviation D is smaller than the constant C3, namely, during running at a constant speed for example, the routine proceeds to Step 114 and the following equation is set, so that the target shift speed dNin° is brought into proportion to the deviation |Nin−Nin°|.

$$dNin° = C4 \times dNin° \times |Nin - Nin°| \quad (1)$$

where C4 is a constant.

In Step 116, Nin and Nin° are compared with each other, and a judgment is made to accelerate or decelerate. If acceleration is adopted, the routine proceeds to Step 118 and the comparative rotational speed Nin' is set as shown in the following equation (2). When deceleration is adopted, the routine proceeds to Step 120, and Nin' is set as shown in the following equation (3).

$$Nin' = Nin' + dNin° \times t \quad (2)$$

$$Nin' = Nin' - dNin° \times t \quad (3)$$

where t is a computing cycle.

This Step successively corrects the comparative rotational speeds Nin' into values (locus) commensurate with the target shift speed dNin° with every computing cycle t.

In Steps 122, 124 and Steps 126, 128, to prevent the comparative rotational speed Nin' from becoming excessively large because of malfunctions and the like, or from becoming excessively small, the limits shown in the following formulae are applied with every acceleration or deceleration. When Nin < Nin°, $$Nin' \leq Nin° + C5 \quad (4)$$

When Nin ≥ Nin°, $$Nin' \geq Nin° - C6 \quad (5)$$

where C5 and C6 are constants.

In Step 130, the feedback gain Kp is brought into proportion to the target shift speed dNin° as shown in the following equation.

$$Kp = C7 \times Kpo \times dNin° \quad (6)$$

where C7 is a constant and Kpo is a basic feedback gain.

In Step 132, a judgment is made as to whether the target shift speed dNin° is larger or smaller than a predetermined value C8. When the target shift speed dNin° is smaller than the predetermined value C8, the feedback gain is set at a constant C9. Since, in Step 130, the feedback gain Kp is brought into proportion to the target shift speed dNin°, in this Step, when the target shift speed dNin° is extremely small, during running at a constant speed for example, the feedback gain Kp disadvantageously becomes excessively small, so the minimum value limit is applied.

In Step 136, the measured value Nin and the target input rotational speed Nin° are compared again, a change in gain is performed with every acceleration (oil flows out of the hydraulic servo device on the input side) and deceleration (oil flows thereinto). In this embodiment, in Step 138, the gain is multiplied by C10 during acceleration.

In Step 140, an absolute value of a deviation between the input rotational speed Nin, which has been measured again, and the target input rotational speed Nin°, is compared with a constant C11, and, when the absolute value is larger than the constant C11 (this occurs when the deviation is large during shifting and so forth)

to quicken the responding speed, the routine goes to Step 142, where the feedback gain Kp is multiplied by C12.

In Step 144, the control voltage Vin of the flow control valve is calculated using the following equation.

$$Vin = Kp(Nin - Nin') + Kd(dNin - dNin^*) \quad (7)$$

where Kd is a constant and dNin is a differentiated value of the measured value Nin. Additionally, when decelerating, dNin in equation (7) is negative value. In this Step, on the basis of the above-described theory, a signal proportionate to the deviation between the target shift speed dNin° and the actual shift speed dNin is applied to the control voltage Vin of the flow control valve. Namely, upon a demand for a shift, the target shift speed is changed to dNin°. As a result, the change is immediately reflected as a change of the control voltage Vin by the second term of the right member of equation (7), so that the response can be improved accordingly.

Figure 11:
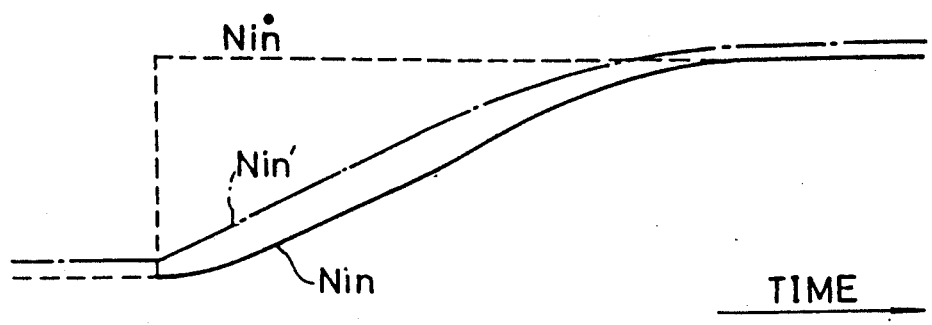
FIG. 11(A) and 11(B) are charts showing the conditions of the response regarding the speed ratio control in the above-described embodiment and in the conventional example, respectively.
Figure 11:
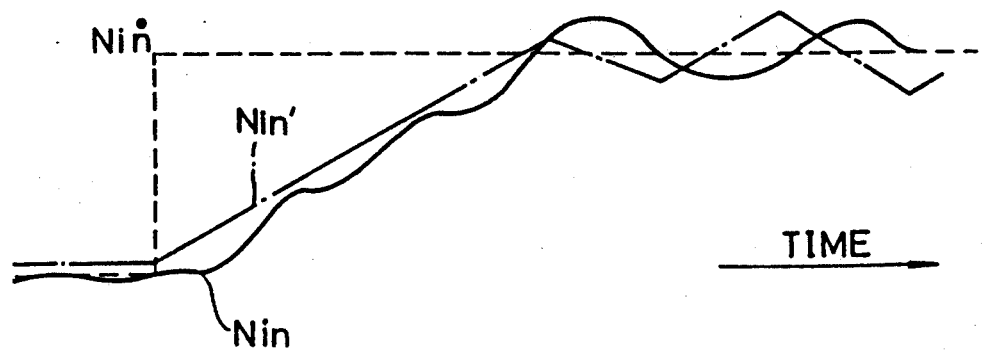

FIG. 11(A) shows the responses in the above-described embodiment. FIG. 11(B) shows the responses in the conventional example. As is apparent, these drawings confirm that the embodiment described above improves the stability, and the response.

Additionally, in the above-described embodiment, as the subject of the target value or the measured value, the input rotational speed Nin has been used. However, according to the present invention, the subject of the target value or the measured value need not necessarily be restricted to the input rotational speed Nin. For example, the speed ratio e of the continuously variable transmission can be used to set a target value.

Furthermore, in the above-described embodiment, in the equation (7), the control voltage Vin is directly calculated. However, according to the present invention, various corrections can be made to take into account the non-linearity of the continuously variable transmission in the equation.

Obviously, numerous modifications and variations of the present invention are possible in light of the above teachings. It is therefore to be understood that while the preferred embodiment of the present invention has been described, the invention is not limited thereto, and may be otherwise embodied within the scope of the following claims.

What is claimed is:

1. A speed ratio control system for a continuously variable transmission for a vehicle, wherein a speed ratio is feed-back controlled in association with a deviation between a target value and a measured value, the target value and the measured value both selected from one of a group consisting of a speed ratio, an input rotation of the continuously variable transmission and an engine speed, whereby said speed ratio can be continuously varied and adjusted, said system comprising:
   means for detecting a magnitude of a deviation between the target value and the measured valve;
   means for adjusting a variable gain of a feedback control based on a size of said deviation; and
   means for using said variable gain to determine the size of the adjustment of the speed ratio that is applied by means of a control voltage to a flow control valve of the continuously variable transmission.

2. A speed ratio control system for a continuously variable transmission for a vehicle, wherein a speed ratio is feed-back controlled whereby said speed ratio can be continuously varied and adjusted, said system comprising:
   means for setting a target shift speed;
   means for detecting whether a magnitude of a deviation between a target value and a measured valve is smaller than a predetermined value, the target value and the measured value both selected from one of a group consisting of a speed ratio, an input rotation of the continuously variable transmission and an engine speed;
   means for adjusting said target shift speed in association with said deviation when said deviation is smaller than said predetermined value; and
   means for using said target shift speed to determine the size of the adjustment of the speed ratio that is applied by means of a control voltage to a flow control valve of the continuously variable transmission.

3. The speed ratio control system set forth in claim 2, wherein said target shift speed is set in proportion to said deviation.

* * * * *